3,079,429
MANUFACTURE OF UNSATURATED ESTERS
Harry Chafetz, Poughkeepsie, N.Y., assignor to Texaco
Inc., New York, N.Y., a corporation of Delaware
No Drawing. Filed Aug. 21, 1961, Ser. No. 132,531
6 Claims. (Cl. 260—494)

This invention relates to a new process for producing unsaturated esters. More specifically, the invention pertains to the preparation of an unsaturated allyl ester of the formula

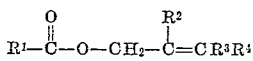

where $R^1$ is alkyl and $R^2$, $R^3$ and $R^4$ are the same or different radicals selected from the group consisting of hydrogen and alkyl.

The unsaturated esters produced by the method of the invention are useful as monomers in the formation of polyester resins which are thermoplastic materials. These unsaturated esters undergo a true polymerization in which the combination of the unsaturated monomers with one another occurs through carbon to carbon bonding. In the process of polymerization of the unsaturated esters, crosslength, 3-dimensional thermoset plastic resins are formed without the splitting off of water or other molecules and hence, these resins can be processed at low pressures or by simple contact. The formed plastic materials are sometimes called contact resins and find their use in the manufacture of light weight transport, prefabricated housing panels, ducts for air conditioning systems, luggage and other products of large bulk such as boats.

In the past unsaturated allyl-type esters have been prepared by standard esterification procedures such as the reaction of a monocarboxylic acid with allyl-type alcohols in the presence of esterification catalysts such as sulfuric acid or hydrochloric acid. Although the past method produces unsaturated esters, it does so in an undesirably low yield in that the unsaturated alcohol in the presence of monocarboxylic acid and inorganic acid esterification catalyst tends to polymerize by addition across the olefinic carbons. In addition the allyl-type alcohol in the presence of mineral acids tend to isomerize into aldehydes. These undesirable side reactions substantially reduce the yield of unsaturated ester.

In contrast I have discovered a novel chemical route for producing unsaturated esters without undue polymerization of the initial and intermediate reactants. More particularly, I have discovered that allyl esters of the formula

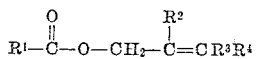

can be prepared in attractive yields by reacting an aldehyde of the formula $R^1$—CHO with an allyl alcohol of the formula

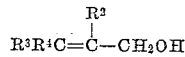

under elevated temperature conditions to form an unsaturated acetal intermediate of the formula

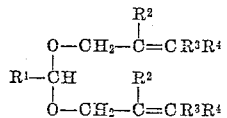

and then subsequently pyrolyzing the acetal intermediate at a high elevated temperature to form an ester of the formula

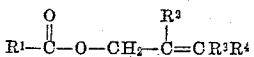

and an olefin by-product of the formula

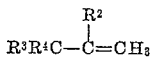

As heretofore stated $R^1$ represents an alkyl radical and $R^2$, $R^3$ and $R^4$ represents a hydrogen or alkyl radical. Among the alkyl radicals contemplated for $R^1$, $R^2$, $R^3$ and $R^4$ are those of from 1 to 12 carbons such as methyl, ethyl, isopropyl, isobutyl, pentyl, decyl and the like.

The first stage of the process, i.e., the reaction between the alkanal and the olefinic alcohol, is desirably conducted at a temperature in the range between about 30 and 150° C., preferably at the reflux temperature for the reaction mixture within said range to facilitate removal of the water by-product, and in a mole ratio of alkanal to unsaturated alcohol of between about 1:1 and 1:10. The first stage reaction is advantageously conducted in the presence of a catalyst in an amount of between about 0.1 and 10 wt. percent based on the weight of the reactants in order to facilitate the formation of the intermediate acetal. Specific catalysts contemplated herein are the anhydrous or hydrated alkaline earth metal chlorides such as calcium chloride, magnesium chloride and barium chloride. It is further advantageous to incorporate in the reaction mixture between about 5 and 50 wt. percent based on the weight of the reactants of an azeotroping agent for water in order to remove the water by-product as overhead during the reaction period thereby facilitating completion of the reaction. Specific examples of the azeotroping agents contemplated herein are methylene chloride, petroleum ether, benzene, toluene, xylene and cumene. Under preferred conditions the first stage reaction is normally continued until approximately 60% or more water by-product based on theoretical is collected as overhead. The acetal intermediate may be separated from the reaction mixture by any standard means such as by fractional distillation.

In the second stage of my process the separated acetal from the first stage is heated at a high elevated temperature, desirably at a temperature between about 300 and 900° C., to decompose the acetal by pyrolysis into the desired unsaturated ester product and olefin by-product. At the advantageous temperature of pyrolization the acetal reactant and ester and olefin products are normally in the gaseous state, therefore, an inert gas is desirably introduced with the acetal reactant in the pyrolysis zone in order to facilitate passage of the reactant in said zone and the removal of the products from said zone. Specific examples of inert gas carriers contemplated herein are nitrogen, helium, argon and xenon.

The unsaturated ester product can be isolated from the pyrolysis reaction mixture by any standard means. For example, under the preferred conditions the ester is passed from the pyrolysis zone as a gas and passed through a condenser. The resultant condensate is comprised primarily of ester and olefin product as well as unreacted acetal. The ester may be isolated from the condensate by conventional means such as selective solvent extraction followed by distillation or by a straight forward fractional distillation.

The pyrolysis reactor is normally of tubular shape and can be constructed of any corrosion and high temperature resistant material such as stainless steel or Pyrex. The reactor can be heated either externally or internally by standard means such as by employing superheated steam coils within the reactor or utilizing an electric furnace which encases at least part of said reactor.

Under advantageous conditions in the second stage the pyrolysis reactor is packed with small inert particles such as ¼" glass helices or porcelain Berl saddles in order to facilitate the even distribution of the reactant throughout the reactor. Also, catalyst may be incorporated in the reactor to aid pyrolysis. An example of such pyrolysis catalyst is 10 wt. percent silver impregnated on fine asbestos. For preferred results the residence time in the reactor for the acetal reactant is advantageously between about 10 and 1000 minutes.

The following examples further illustrate the invention but are not to be interpreted as limitations thereof:

*Example I*

This example illustrates the first stage of my process and is directed to the preparation of isobutyraldehyde diallyl acetal from isobutyraldehyde and allyl alcohol.

To a 250 milliliter three-neck flask fitted with a thermometer, stirrer and water separator, there was added 36 grams (0.5 mole) of isobutyraldehyde, 58 grams (1 mole) of allyl alcohol, 94 grams methylene chloride and 10 grams of anhydrous calcium chloride. The reaction mixture was refluxed (58–64° C.) with stirring until the water by-product recovered as overhead reached 58% of theoretical. The residual reaction mixture was filtered and the filtrate fractionally distilled under reduced pressure. Isobutyraldehyde diallyl acetal in an amount of 65.5 grams was recovered as the fraction having a boiling point between 74–75° C. at 20 millimeters mercury pressure. The acetal was found to have a refractive index ($n_D^{20}$) of 1.4278, a carbon content of 69.0% (70.6% theoretical) and a hydrogen content of 10.7% (10.7% theoretical). The yield of acetal was calculated to be 78 mole percent based on the isobutyraldehyde reactant.

*Example II*

This example further illustrates the first stage of my process. It is specifically directed to the preparation of isobutyraldehyde dimethallyl acetal from isobutyraldehyde and methallyl alcohol.

To a 1000 milliliter three-neck flask, fitted with a thermometer, condenser and water separator there was added 360 grams (5 moles) methallyl alcohol, 288 grams (4 moles) isobutyraldehyde and 88 grams of anhydrous calcium chloride. The resultant mixture was refluxed (90–118° C.) for 24½ hrs. during which time 38.5 milliliters of water (86% theoretical) were collected in the water separator. The residual reaction mixture was filtered with the aid of 100 milliliters of petroleum ether, and the filtrate was stripped to a pot temperature of 143° C. The stripped residuum was fractionally distilled at reduced pressure. The fraction collected at between 95.5 and 99.5° C. at 20 millimeters mercury pressure and weighing 319 grams was identified as isobutyraldehyde dimethallyl acetal. The acetal was recovered in a yield of 40 mole percent based on the isobutyraldehyde reactant and was found to have a refractive index ($n_D^{20}$) of 1.4350 and an iodine number of about 298 (calculated 256).

*Example III*

This example illustrates the second stage of my process. More particularly, it pertains to the conversion of the acetal produced in Example I into allyl isobutyrate by pyrolysis.

The pyrolysis apparatus employed comprised a Pyrex tube of 1″ x 24″ dimensions encased by an electric furnace, the exit end of the Pyrex tube reactor being connected to a water cooled condenser which in turn is connected to a Dry Ice isopropyl alcohol cold trap. The inlet of said tube is connected to an isobutyraldehyde diallyl acetal and nitrogen gas source. About 200 milliliters of the reactor tube were packed with ¼ inch glass helices.

Through the reactor tube preheated to and maintained at a temperature between 343 and 346° C., there was passed 150 grams of isobutyraldehyde diallyl acetal at a rate of 30 milliliters per hour. 130 grams of crude product, constituting a yield of 87 wt. percent based on the acetal reactant, were recovered as condensate from the water condenser. The crude product was analyzed by gas chromatography and found to contain 53.5 wt. percent of allyl isobutyrate. The crude product was then fractionally distilled at atmospheric pressure and the fraction collected at 126–129° C. having a refractive index ($n_D^{20}$) of 1.4125 was identified as allyl isobutyrate.

*Example IV*

This example further illustrates the second stage of the novel process and specifically relates to the conversion of the acetal of Example II into methallyl isobutyrate.

To the pyrolysis reactor described in Example III with the exceptions that the packing therein was 3 mm. glass beads and the temperature was maintained at 450–460° C., there was added 58.5 grams of isobutyraldehyde dimethallyl acetal at a rate of 34 milliliters/hour together with nitrogen at a rate of 3 milliliters $N_2$/minute. The crude product emitting from the pyrolysis reactor was condensed by the water condenser and weighed 42.7 grams representing a yield of 73% based on the weight of the initial acetal reactant. The crude product was fractionally distilled and the fraction recovered at a temperature between 146–154° C. at atmospheric pressure was identified as methallyl isobutyrate. The recovered methallyl isobutyrate weighing 24 grams, representing a yield of 58 mole percent based on the initial acetal reactant, had a refractive index ($n_D^{20}$) of 1.4174.

I claim:
1. A process for preparing an unsaturated ester of the formula:

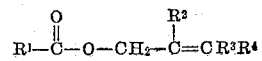

where $R^1$ is alkyl of from 1 to 12 carbons and $R^2$, $R^3$ and $R^4$ are members selected from the group consisting of hydrogen and alkyl of from 1 to 12 carbons comprising reacting an aldehyde of the formula $R^1$—CHO with an unsaturated alcohol of the formula:

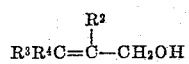

at a temperature between about 30 and 150° C. in a mole ratio of said aldehyde to said alcohol between about 1:1 and 1:10 to form an unsaturated acetal of the formula:

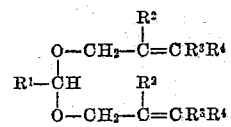

separating said acetal from the reaction mixture and subsequently pyrolyzing said acetal at a temperature between about 300 and 900° C. to form said unsaturated ester, and subsequently recovering said ester from the pyrolyzed reaction product.

2. A process for preparing an unsaturated ester of the formula

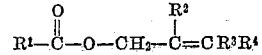

where $R^1$ is alkyl of from 1 to 12 carbons and $R^2$, $R^3$ and $R^4$ are members selected from the group consisting of hydrogen and alkyl of from 1 to 12 carbons comprising reacting an aldehyde of the formula $R^1$—CHO with an unsaturated alcohol of the formula

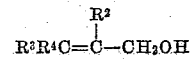

at a temperature between about 30 and 150° C. in a mole ratio of said aldehyde to said alcohol between about 1:1 and 1:10 in the presence of between about 0.1 and 10 wt. percent alkaline earth metal chloride based on the weight of the reactants to form an unsaturated acetal of the formula

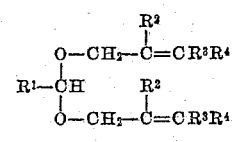

separating said acetal from the reaction mixture and subsequently pyrolyzing said acetal at a temperature between about 300 and 900° C. to form said unsaturated ester, and subsequently recovering said ester from the pyrolyzed reaction product.

3. A process in accordance with claim 2 wherein $R^1$ is isopropyl and $R^2$, $R^3$ and $R^4$ are hydrogen, said alkaline earth metal chloride is anhydrous calcium chloride.

4. A process in accordance with claim 2 wherein $R^1$ is isopropyl, $R^2$ is methyl and $R^3$ and $R^4$ are hydrogen.

5. A process for preparing an unsaturated ester of the formula

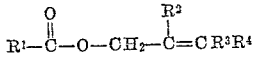

where $R^1$ is isopropyl $R^2$, $R^3$ and $R^4$ are hydrogen comprising heating an aldehyde of the formula $R^1$—CHO with an alcohol of the formula

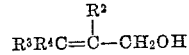

in a mole ratio of about 1:2 at a temperature between about 58 and 64° C. in the presence of about 11 wt. percent anhydrous calcium chloride and about 100 wt. percent methylene chloride based on the weight of the reactants to form an intermediate acetal of the formula

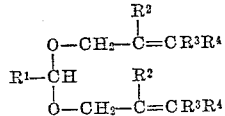

separating said acetal from the reaction mixture by a fractional distillation, subsequently passing the separated acetal together with an inert carrier gas through a pyrolysis reactor maintained at a temperature between about 340 and 350° C., condensing the product gases emitting from said reactor and fractionally distilling said condensate to recover said unsaturated ester.

6. A process in accordance with claim 5 wherein said carrier gas is nitrogen.

7. A process for preparing an unsaturated ester of the formula

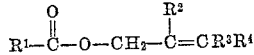

where $R^1$ is isopropyl, $R^2$ is methyl and $R^3$ and $R^4$ are hydrogen comprising refluxing an aldehyde of the formula $R^1$—CHO with an alcohol of the formula

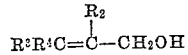

at a temperature between about 90 and 118° C. in a mole ratio of said aldehyde to said alcohol of about 4:5, separating from the reaction mixture the formed intermediate acetal of the formula

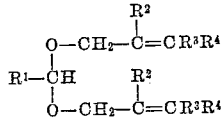

by fractional distillation, subsequently passing said acetal with an inert carrier gas through a pyrolysis reactor maintained at a temperature of between about 450 and 460° C., condensing the gases emitting from said reactor and recovering said ester from the condensate by fractional distillation.

8. A process in accordance with claim 7 wherein said carrier gas is nitrogen.

No references cited.